(12) United States Patent
Kesil et al.

(10) Patent No.: US 9,505,128 B1
(45) Date of Patent: Nov. 29, 2016

(54) METHOD OF TEACHING ROBOTIC STATION FOR PROCESSING OBJECTS

(71) Applicants: Boris Kesil, Santa Clara, CA (US); Elik Gershenzon, Santa Clara, CA (US)

(72) Inventors: Boris Kesil, Santa Clara, CA (US); Elik Gershenzon, Santa Clara, CA (US)

(*) Notice: Subject to any disclaimer, the term of this patent is extended or adjusted under 35 U.S.C. 154(b) by 0 days.

(21) Appl. No.: 14/749,572

(22) Filed: Jun. 24, 2015

(51) Int. Cl.
*G05B 19/04* (2006.01)
*B25J 9/16* (2006.01)

(52) U.S. Cl.
CPC ............... *B25J 9/163* (2013.01); *Y10S 901/03* (2013.01); *Y10S 901/31* (2013.01); *Y10S 901/46* (2013.01)

(58) Field of Classification Search
None
See application file for complete search history.

(56) References Cited

U.S. PATENT DOCUMENTS

| | | | |
|---|---|---|---|
| 4,675,502 | A | 6/1987 | Haefner et al. |
| 4,831,549 | A | 5/1989 | Red et al. |
| 5,297,238 | A | 3/1994 | Wang et al. |
| 8,242,730 | B2 | 8/2012 | Nichols et al. |

FOREIGN PATENT DOCUMENTS

WO    WO 2010136961    10/2010

*Primary Examiner* — Bhavesh V Amin

(57) ABSTRACT

Proposed is a method of teaching an industrial robotic station with elimination of errors of assembling and installation as well as errors accumulated during operation for a predetermined operation time or a number of operation cycles. The method consists of providing a robotic station with a coordinate system fixed relative to the frame and all other stationary components including at least two reference objects, one of which is a tactile sensor and another is a hard body such as a hard spherical ball. A position of the center of the hard precision in the fixed coordinate system of the robotic station is determined via contact with a changeable tactile sensor attached to the coupling of the robot arm and is assumed as center of coordinates of an operative coordinate system which is then used for moving the robot arm to working positions memorized in a CPU and in accordance with a memorized sequence.

16 Claims, 8 Drawing Sheets

```
┌─────────────────────────────────────────────────────────────────────────┐
│ STEP 1. ACTIVATION OF THE ROBOT AND BRINGING THE ROBOT TO THE STATE OF  │
│ THE FIRST CONFIGURATION                                                  │
└─────────────────────────────────────────────────────────────────────────┘
                                    │
┌─────────────────────────────────────────────────────────────────────────┐
│ STEP 2. ACTIVATION OF ROBOT MOVEMENTS AND BRINGING THE COUPLER IN        │
│ CONTACT WITH THE STATIONARY (NON-REPLACEABLE) FLEXIBLE REFERENCE TACTILE │
│ SENSOR 50 IN THE AUXILIARY FIXED COORDINATE SYSTEM                       │
└─────────────────────────────────────────────────────────────────────────┘
                                    │
┌─────────────────────────────────────────────────────────────────────────┐
│ STEP 3. BRINGING THE ROBOT THE STATE OF THE SECOND CONFIGURATION BY      │
│ INSERTING A REPLACEABLE TACTILE SENSOR 54 INTO THE COUPLER 38A           │
└─────────────────────────────────────────────────────────────────────────┘
                                    │
┌─────────────────────────────────────────────────────────────────────────┐
│ STEP 4. BRINGING THE REPLACEABLE TACTILE SENSOR 54 IN CONTACT WITH THE   │
│ SECOND REFERENCE OBJECT (SPHERICAL BALL) 52 AND DEFNING THE MEASURING    │
│ COORDINATE SYSTEM WITH MEASUREMENT UNITS IN TERMS OF DIMENSIONS OR       │
│ FRACTURE OF DIMENSIONS OF THE SECOND REFERENCE OBJECT                    │
└─────────────────────────────────────────────────────────────────────────┘
                                    │
┌─────────────────────────────────────────────────────────────────────────┐
│ STEP 5. SEQUENTIALLY DETERMINING COORDINATES OF THE POSITIONS OF THE     │
│ TOOLS AND UNITS WHICH SHOULD BE COUPLED WITH THE ROBOT ARM OR            │
│ ACTIVATED IN ACCORDANCE WITH THE PROCEDURE IN THE MEASURING              │
│ COORDINATE SYSTEM                                                        │
└─────────────────────────────────────────────────────────────────────────┘
                                    │
┌─────────────────────────────────────────────────────────────────────────┐
│ STEP 6. BRINGING THE ROBOT TO THE STATE OF THE THIRD CONFIGURATION       │
│ AND PERFORMING OPERATIONS SUCH AS UNPACKING THE CANISTER 31 FROM         │
│ THE INTERLEAVES, ETC., TRANSFERRING THESE OBJECTS TO THE C TRANSFER      │
│ OF WAFERS FROM THE CANISTER 31 TO THE CANISTER 33, PICKING UP THE        │
│ WAFER, TRANSFERING THE WAFER TO THE CHECKING STATION 28, ETC.            │
└─────────────────────────────────────────────────────────────────────────┘
                                    │
┌─────────────────────────────────────────────────────────────────────────┐
│ STEP 7. BRINGING THE ROBOT TO THE STATE OF THE FOURCH CONFIGURATION      │
│ BY REPLACING THE ROBOT ARM HEAD 40 WITH A END EFFECTOR 36                │
└─────────────────────────────────────────────────────────────────────────┘
                                    │
┌─────────────────────────────────────────────────────────────────────────┐
│ STEP 8. TRANSFERRING THE WAFER FROM THE CHECKING STATION 28 TO THE       │
│ FOUP 30 OR 32                                                            │
└─────────────────────────────────────────────────────────────────────────┘
                                    │
┌─────────────────────────────────────────────────────────────────────────┐
│ TRANSFER OF THE ROBOT TO THE STATE OF THE THIRD CONFIGURATION AND        │
│ MULTIPLE REPETITION OF THE STEPS 6 TO 8 UNITL ACCCUMULATION OF A GIVEN   │
│ NUMBER OF WORKING CYCLES OR UNTIL EXPERIRATION OF A GIVEN TIME           │
└─────────────────────────────────────────────────────────────────────────┘
                                    │
┌─────────────────────────────────────────────────────────────────────────┐
│ RESETTING OF THE DATA AND RETURN TO STEP 1                               │
└─────────────────────────────────────────────────────────────────────────┘
```

FIG. 7

```
┌─────────────────────────────────────────────────────────────────────────┐
│ Initialization of the robot station with the coupling of the robot arm  │
│ free of an EOAT; the coordinates of the stations and units fixed        │
│ relative to the platform have been preset from the production drawings  │
│ or a model in a fixed, i.e., an auxiliary coordinate system.            │
└─────────────────────────────────────────────────────────────────────────┘
                                    │
┌─────────────────────────────────────────────────────────────────────────┐
│ The robot arm moves the coupling to a position in a vicinity of the     │
│ reference tactile sensor 50.                                            │
└─────────────────────────────────────────────────────────────────────────┘
                                    │
┌─────────────────────────────────────────────────────────────────────────┐
│ The coupling 38a of the robot arm touches the reference tactile sensor  │
│ 50 in at least three points, and the CPU registers these points to form │
│ the operational coordinate system.                                      │
└─────────────────────────────────────────────────────────────────────────┘
                                    │
┌─────────────────────────────────────────────────────────────────────────┐
│ The robot arm picks the changeable tactile sensor 54 and moves it to    │
│ the vicinity of the fixed precision ball.                               │
└─────────────────────────────────────────────────────────────────────────┘
                                    │
┌─────────────────────────────────────────────────────────────────────────┐
│ The robot arm touches the precision ball 52 with the changeable tactile │
│ sensor 54 at least in three points (the distance between the reference  │
│ tactile sensor 50 and the precision ball is known and preset).          │
└─────────────────────────────────────────────────────────────────────────┘
                                    │
┌─────────────────────────────────────────────────────────────────────────┐
│ The robot arm with the changeable tactile sensor (current EOAT) in the  │
│  coupling sequentially touches all the stations, tools, etc., in so     │
│  many points that are necessary for unequivocally determining positions │
│      and orientations of the objects to be treated in the process.      │
└─────────────────────────────────────────────────────────────────────────┘
                                    │
┌─────────────────────────────────────────────────────────────────────────┐
│  The robot arm coupling drops the changeable tactile sensor 54 into the │
│                      respective nest of the platform.                   │
└─────────────────────────────────────────────────────────────────────────┘
                                    │
┌─────────────────────────────────────────────────────────────────────────┐
│  The robot coupling picks an EOAT (edge gripper, robot arm head, etc.)  │
│                       needed for the next operation.                    │
└─────────────────────────────────────────────────────────────────────────┘
                                    │
┌─────────────────────────────────────────────────────────────────────────┐
│ The robot arm coupling moves the EOAT to the object to be treated next, │
│ picks up this object, and moves it to the desired position for processing.│
└─────────────────────────────────────────────────────────────────────────┘
                                    │
┌─────────────────────────────────────────────────────────────────────────┐
│ Upon completion of the planned processing operation,                    │
│ the robot arm picks the processed object and moves it to an appropriate │
│ position of the next processing station, or to storage, unloading, etc. │
└─────────────────────────────────────────────────────────────────────────┘
                                    │
┌─────────────────────────────────────────────────────────────────────────┐
│ The procedures of Items 8 to 10 are repeated so many times as preset by │
│     number of working cycles or duration of time.                       │
└─────────────────────────────────────────────────────────────────────────┘
                                    │
┌─────────────────────────────────────────────────────────────────────────┐
│ Upon expiration of time or accumulation of the number of cycles, the    │
│ CPU switches the robotic station to the self-teaching mode of operation.│
└─────────────────────────────────────────────────────────────────────────┘
```

Fig. 8

METHOD OF TEACHING ROBOTIC STATION FOR PROCESSING OBJECTS

FIELD OF THE INVENTION

This disclosure relates to a method of teaching an industrial robotic station with automatic elimination of errors of assembling and installation as well as errors accumulated during operation of the robotic station after a predetermined operation time or a predetermined number of operation cycles. A teachable robotic station may be used, e.g., for handling and processing objects such as semiconductor wafers, disks, substrates, and other small and delicate objects which are not necessarily round or flat, e.g., rings, etc. More specifically, the disclosure relates to a method of teaching of an industrial robotic station provided with a function of self-compensation of errors accumulated as a result of slacks, wear, flexibility in connections, etc.

BACKGROUND OF THE INVENTION

Robotic stations with self-teaching functions are known in the art. One of the most time-consuming and difficult tasks in connection with the use of robotic stations is a robot arm with End of Arm Tools (EOAT), such as edge grippers, or end effectors for moving along a preprogrammed rout with high accuracy on each working cycle.

A large automated robotic station may have a plurality of points that must be manually taught. The operator moves a robot's end effector through a required number of degrees of freedom to align the end effector within an acceptable tolerance to given picking/placing/processing positions. The speed and accuracy of this operation depends on such factors as experience, fatigue, visual acuity of the robot operator, etc. Even though the teaching process is accurate, reliability of the robot operation may also depend on plays in connections of the tooling and end effectors to the robot arm and on slack accumulated after a certain amount of the performed cycles. Consequently, such taught points often need to be refined by the robot operator one or more times to increase the accuracy of the point.

The precision teaching allows accurate placement of delicate parts into cassette or other media, or on process chuck, etc., without damaging and/or rubbing walls thus reducing generation of particles and improving the yield.

Methods of teaching teachable robotic stations for handling and processing objects are known in the art and described in a number of patent publications.

For example, U.S. Pat. No. 5,297,238 discloses a method for calibrating a tool control frame (TCF) on a robot with respect to a known calibration reference claim (CRF), wherein the (CRF) is in rigid body relationship with a robot link. The method includes the steps of (a) attaching a sensory tool to the robot link, (b) calibrating the sensory tool with appropriate units of measurement, (c) identifying a calibration feature to be mapped by the sensory tool, (d) causing relative movement of the calibration feature within sensing range of the sensory tool, (e) recording robot configuration and pose as a first data record, (f) causing relative movement of the calibration feature and sensory tool along a known direction to a new position within sensing range, (g) recording configuration and pose as a second data record, and (h) applying coordinate transformations to the respective data records to generate a correct tool control frame (TCF) pose with respect to the (CRF).

U.S. Pat. No. 4,675,502 discloses a real time tracking control for taught path robots. A real time steering capability is provided to permit robot motion to be modified continuously in three dimensions as the robot is moving along a taught path. An arc welding robot or other taught path robot has a sensor located on the robot arm to sense the position of a desired path. The tracking control provides real time steering commands to the standard robot taught path and are calculated based on maintaining a constant, preprogrammed velocity along the desired path and coordination with the taught path.

U.S. Pat. No. 4,831,549 discloses a device and method for improving orientation and/or location accuracy of a programmable robot with respect to a target object. The method consists of calibrating the position of a terminal control frame associated with a robot end-effector which is coupled to a robot distal link. Separated reference positions external from the robot are identified, as to geometry and spatial data. This identification data is stored for later recall and comparison for use in determining a localized relative frame of reference. The robot end-effector is moved to a first reference position and a rigid body error correction is determined. This correction is stored in computer memory for application to later computer movement.

International Patent Application Publication WO 2010136961 discloses a method and a control device for controlling a robot having a robot arm with a number of individual arm sections, an end effector connected to one of the arm sections and a number of actuators for moving at least the end effector and at least one of the arm sections in at least two different modes of operation, i.e., a working mode and a training mode that corresponds to the working movements. The robot control device corrects the teaching position of the motion program stored in the storage, based on a change in the relative position obtained by the position calculator.

U.S. Pat. No. 8,242,730 discloses an automated robot teach tool and a method of use of the teach tool. The latter enables automatic teaching of pick and place positions for a robot. The automated robot teaches tool obviates the need for manual operation of the robot during the teaching. The result is an automated process that is much faster, more accurate, more repeatable and less taxing on a robot operator. The teach tool comprises: a body assembly with a proximity sensor mounted therein that is releasably mated with a robot end effector; a foot assembly coupled to the body assembly, wherein the foot assembly comprises a sensor target mounted therein that is located about the proximity sensor; and wherein the proximity sensor and the sensor target are configured to detect signals representative of a perturbation as the robot end effector moves the body assembly and foot assembly from a central position within a workpiece receptacle through six degrees of freedom. The aforementioned signals are used to determine a precise orientation for the robot end effector to pick up and place a workpiece to and from the workpiece receptacle. Signals representative of the perturbation are generated in response to the foot assembly colliding with a horizontal surface or a vertical surface of the workpiece receptacle.

SUMMARY OF THE INVENTION

The present invention relates to a method of precision teaching an industrial robotic station with automatic elimination of errors of assembling and installation, as well as errors accumulated during operation of the robotic station after a predetermined operation time or a predetermined number of operation cycles. A teachable robotic station suitable for implementation of the method of the invention may be a robotic station for handling and processing objects such as semiconductor wafers, disks, and substrates. The objects are not necessarily flat and may comprise small and delicate objects other than disks, or flat substrates.

The method consists of providing a robotic station with a coordinate system fixed relative to the frame and all other stationary components including at least two reference objects, one of which is a tactile sensor and another is a hard body such as a hard spherical ball. A position of the center of the hard precision in the fixed coordinate system of the robotic station is determined via contact with a changeable tactile sensor attached to the coupling of the robot arm and is assumed as center of coordinates of an operative coordinate system which is then used for moving the robot arm to working positions memorized in a CPU and in accordance with a memorized sequence.

More specifically, in a predetermined period of time or after a predetermined number of working cycles under control of the CPU the robot arm replaces a current working tool, e.g., an end effector with edge gripper, with a changeable tactile sensor for checking the state of accuracy in positions of all units and tools involved in the process. For this purpose, the coupler of the robot arm touches the stationary (non-changeable) flexible reference tactile sensor as many times as needed for geometrically determining exact position of the coupler relative to the position of the changeable tactile sensor in an auxiliary fixed coordinate system of the robot frame, which was preliminarily stored in the memory of the CPU. In this auxiliary coordinate system, the position of the center of the stationary (non-changeable) flexible reference tactile sensor 50 is assumed as a center of coordinate, and initial coordinates of the coupler and of the changeable tactile sensor stored in its nest are known and preset in the memory of the CPU in the form of coordinates of the auxiliary coordinate system directly from the production drawings or a reference model.

Next, the coupler a goes to the changeable tactile sensor and pick it up. The robot arm with the changeable tactile sensor moves to the hard precision ball and touches it, at least in four different points. For determining exact position of the ball center, the tactile sensor also touches the surface of the support plate at least in three points. Following this, the changeable tactile sensor sequentially touches all units and tools that participate in the specific process in so many points as necessary for unequivocally defining positions of these parts and units in the aforementioned operational coordinate system. These positions are stored in the CPU for controlling subsequent movement of the tools in the object processing cycle that follows the teaching cycle and is repeated for the number of cycles for the time recorded in the CPU.

After expiration of the given period of time or completion of a predetermined number of working cycles, the current working tool is dropped in its proper nest on the station, coupler of the robot's arm is disconnected from the current working tool and is moved to the stationary (non-changeable) flexible reference tactile sensor to touch the latter (FIG. 3), and the teaching cycle is repeated.

The robot teaching method of the invention allows automatic compensation of accumulated errors without interruption of the working process. Such errors may be accumulated due to stack of tolerances and object holding media deviations after completion of a certain number of working cycles or because of a play in attachment mechanisms for connection of changeable tools, etc. Elimination of the errors becomes possible because with the beginning of each teaching cycle all the data stored heretofore for the preceding working cycle are reset and a new reference point of coordinate is established for the next operative cycle.

BRIEF DESCRIPTION OF THE DRAWINGS

FIG. 7 is a flowchart illustrating a sequence of operation of the robotic station of the invention at the processing stage.

FIG. 8 is a flowchart illustrating a sequence of operation of the robotic station of the invention at the teaching stage.

DETAILED DESCRIPTION OF THE INVENTION

This invention relates to a teachable robotic station for handling and processing flat or non-flat objects such as semiconductor wafers, disks, substrates, rings, bridge tools, etc. for processing wafers having different sizes, etc.

Figure 1:
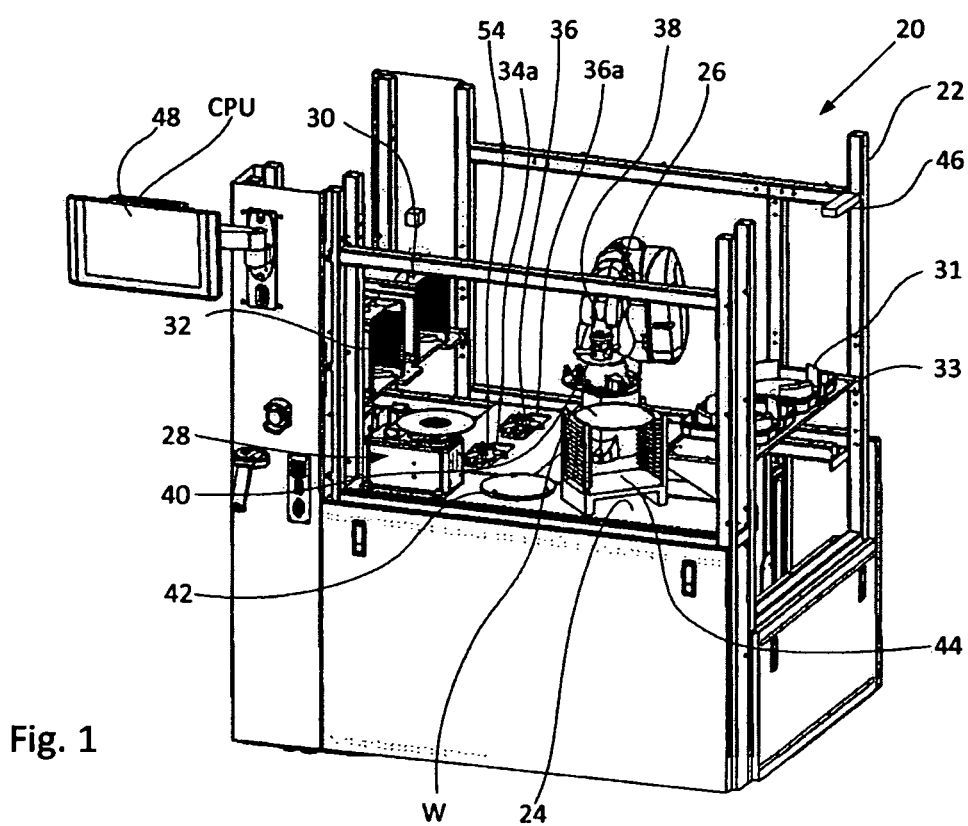
FIG. 1 is a general perspective view of a robotic station of the invention, where for simplicity of the drawing the station is shown without robot teaching components.

A general perspective view of a robotic station 20 of the invention is shown in FIG. 1, where for simplicity of the drawing the station is shown without robot teaching components.

As can be seen from FIG. 1, the robotic station 20 comprises a frame 22 that has a platform 24 which supports a robot arm assembly with the robot arm having a plurality of axes for linear and rotational motions, e.g., a six-coordinate robot arm assembly 26 that is located substantially in the center of the platform 24 and is surrounded by a plurality of object processing units (hereinafter referred to as "processing units") such as a checking unit 28, e.g., for measuring object parameters such object ID, weight, warping, position of a notch, etc., a couple of FOUPs 30 and 32 for storing the processed objects, a pair of canisters 31 and 33 obtained from a factory or from a customer for transporting and storing unprocessed objects (in the context of the present application the term "processing" also covers "storage" of the processed and unprocessed objects in the FOUPs and canisters, respectively), and a plurality of interchangeable end effectors, such as end effectors 34 and 36, which are located on the same platform within the limits of operation area of the arm 38 of the robot assembly 26. The platform 24 also has a plurality of storage places, (hereinafter called nests) for storing robot teaching tools that are not shown in FIG. 1 and will be described below.

All manipulations of the industrial robot arm 38 are possible due to degrees of freedom, six in the illustrated case, provided by the mechanism of the robot assembly 26 that may comprise a standard robot arm assembly engageable with the interchangeable end effectors 34 and 36 and other interchangeable EOATs, including sensors as teaching tools, that can be connected to and disconnected from the robot arm 38.

Figure 2:
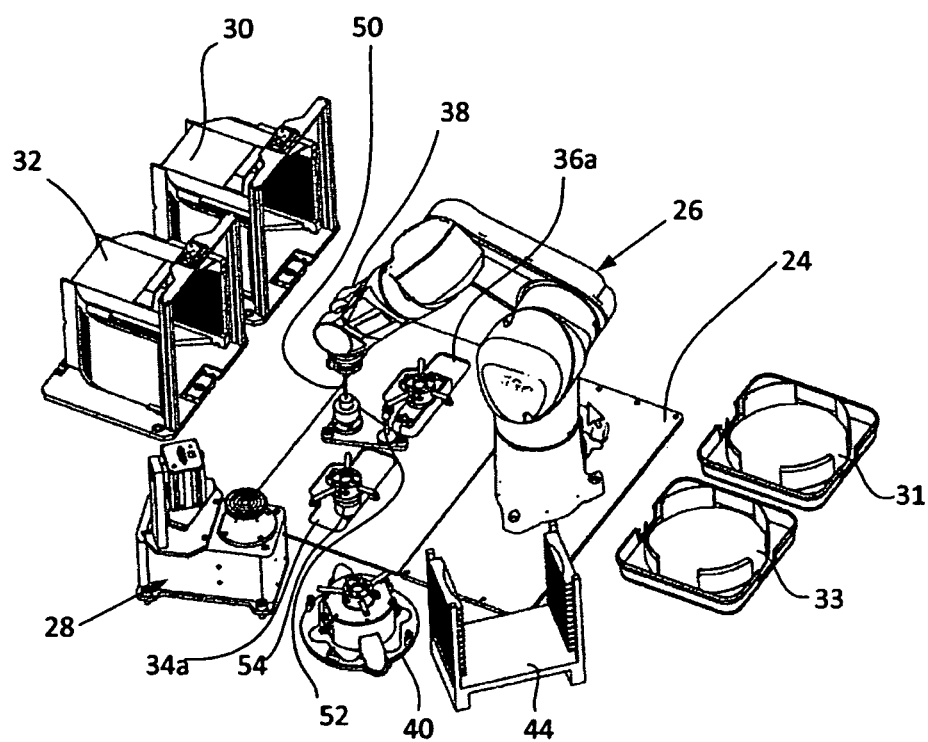
FIG. 2 is a three-dimensional view of the robotic station of FIG. 1 on a larger scale with the image of the frame being omitted.
Figure 3:
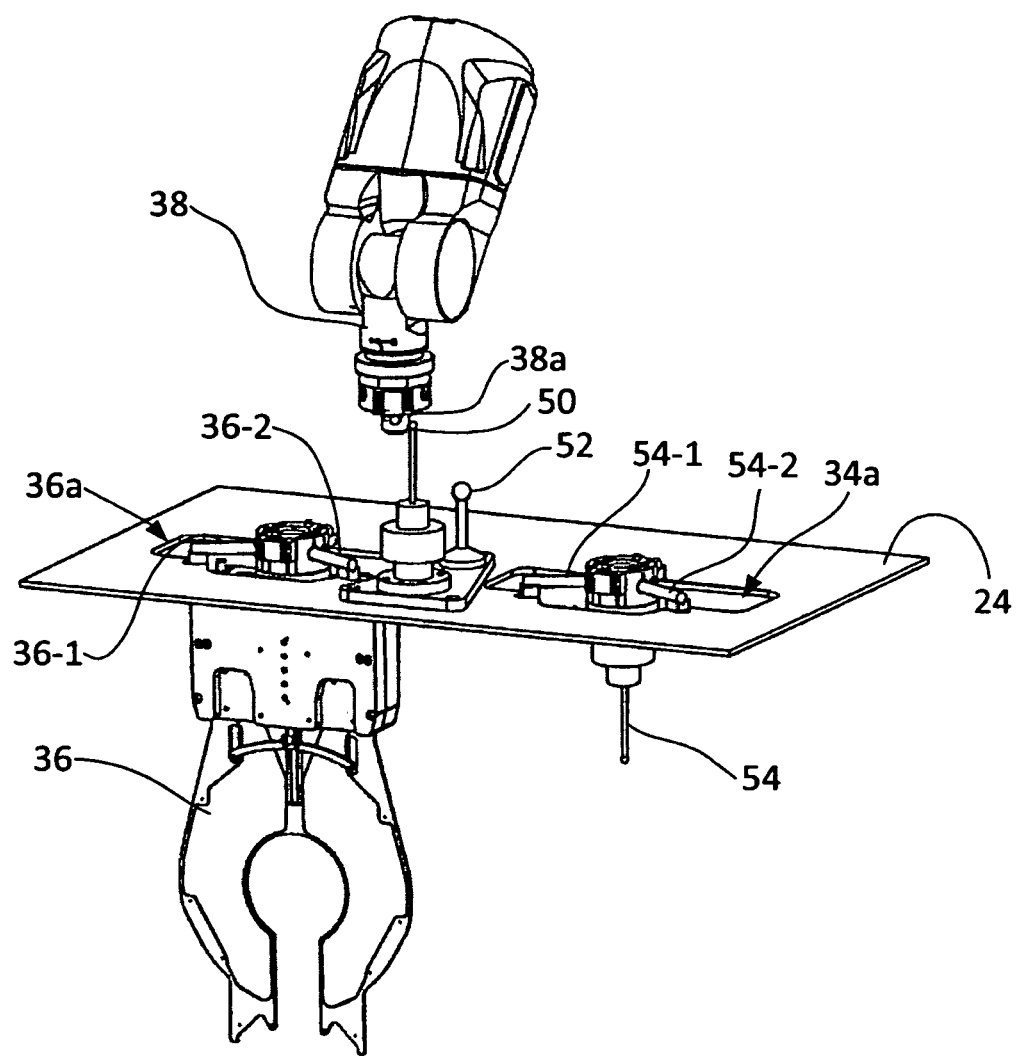
FIG. 3 is a view that shows the coupler in contact with the stationary (non-changeable) flexible reference tactile sensor.
Figure 4A:
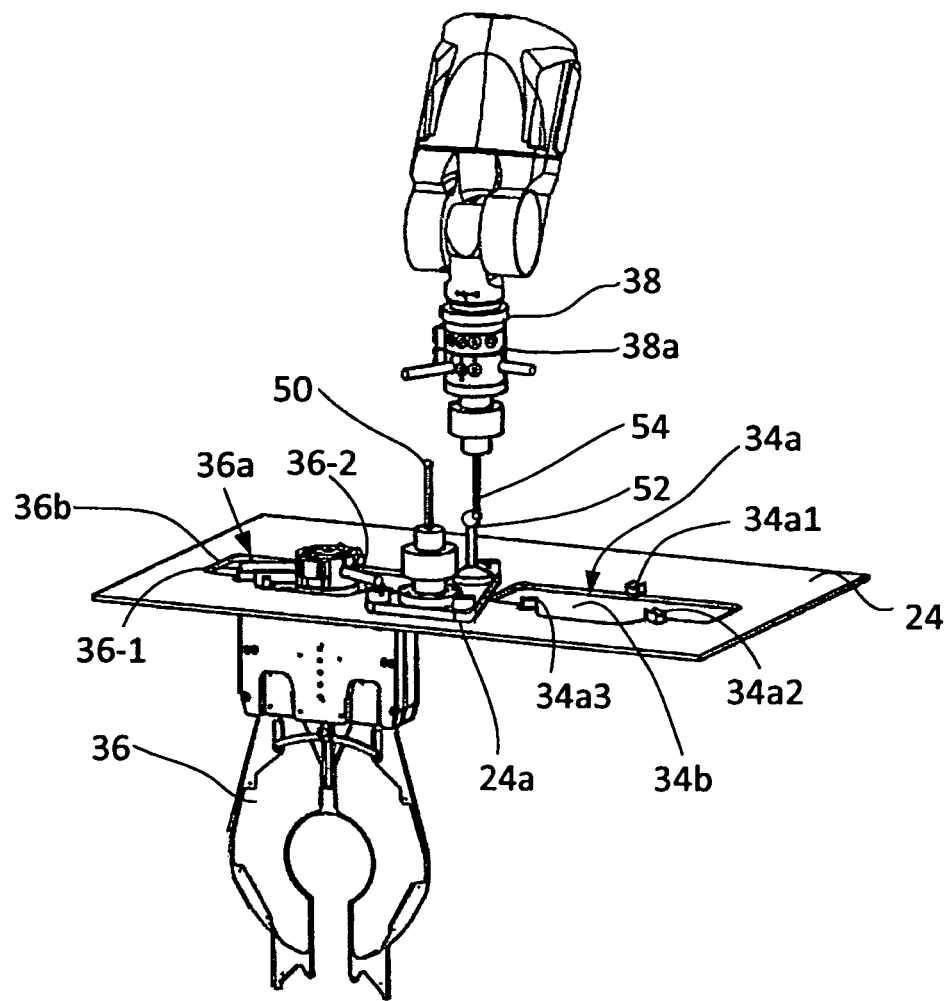
FIG. 4A is a view that shows a changeable tactile sensor fixed on a platform in contact with a second reference object.

The robot end can interchangeably interact either with a robot arm head 40 which in FIG. 1 is shown attached to the robot arm 38, or with end effectors 34 and 36 which in FIG. 1 are shown stored in respective nests 34a and 36a formed in the platform 24 with configurations that match respective elements of the end effectors 34 and 36 dropped into these nests. The nests 34a and 34b and the respective elements of the end effectors insertable into the nests are shown in FIG. 2, which is a three-dimensional view of the robotic station of FIG. 1 but without the frame 22. In more detail the nests 34a and 36a are shown in FIGS. 3 and 4A. More specifically, the nests comprise openings, such as openings 34b and 36b, having precision prismatic supports 34a1, 34a2, and 34a3 (FIG. 4A). On the other hand, the changeable EOATs (which in FIG. 3 are shown as the end effector 36 and the changeable tactile sensor 54 described later) have three radial projections, such as projections 36-1, 36-2 (FIGS. 3 and 4). The circumferential position of these radial projections strictly correspond to the positions of the support prisms, so that when any interchangeable EOAT is supported on the prisms. Angular positions of the support prisms are stored in the memory of the CPU so that the each EOAT may be precisely stored on the respective prismatic support and the CPU can locate the position of the EOAT needed for the current use and pick it up from the respective nest.

In fact, both the end effectors 34 and 36 and the robot arm head 40 are EOATs or working tools of the robot assembly which perform different functions. For example, the end effectors 34 and 36 are used for manipulating rigid flat objects such as semiconductor wafers or wafer substrates, and the robot arm head 40 is used for handling soft objects such as interleaves and/or rigid objects such as wafers or rings.

Reference numeral 42 designates a kinematic mount waiting station for replaced robot arm head 40 which stays on the station 42 while the robot arm 38 works with the end effectors 34a and 34b. Reference numeral 44 designates an intermediate storage for flat objects, e.g., wafers (only one wafer W is shown in FIG. 1 as an example), where these objects can be temporary stored while the robot arm 38 works with the end effector.

The robotic station 20 is also provided with an optical sensor 46 (FIG. 1) for identification of the types of the objects, e.g., unprocessed semiconductor wafers W (FIG. 1) or interleaves located in the canister 31. In response to identification of the interleaves or other objects which are not needed for processing, the unnecessary object is placed into the canister 33.

The robotic station 20 is also provided with a visual display 48 (FIG. 1) which displays a current operation stage on the screen.

Let us consider operations of the robotic station 20 of the invention by referring to picking up, transporting, processing, and sorting semiconductor wafers W stored in the canisters 31 and 33 (FIG. 2), e.g., eLX™ Zero-Movement Canisters (the product of ePak Co., TX, USA). These canisters are characterized by containing objects of different types, e.g., semiconductor wafers, paper or fabric interleaves, and plastic separation rings. It is understood that paper, fabric and plastic objects have different rigidity. Therefore, a conventional mechanical gripper is not suitable for handling all these objects, and a special end effector is needed for accomplishing this task. Such specific end effector (robot arm head 40) is a subject of another patent application Ser. No. _____ filed by the same Applicants on _____.

Figure 5:
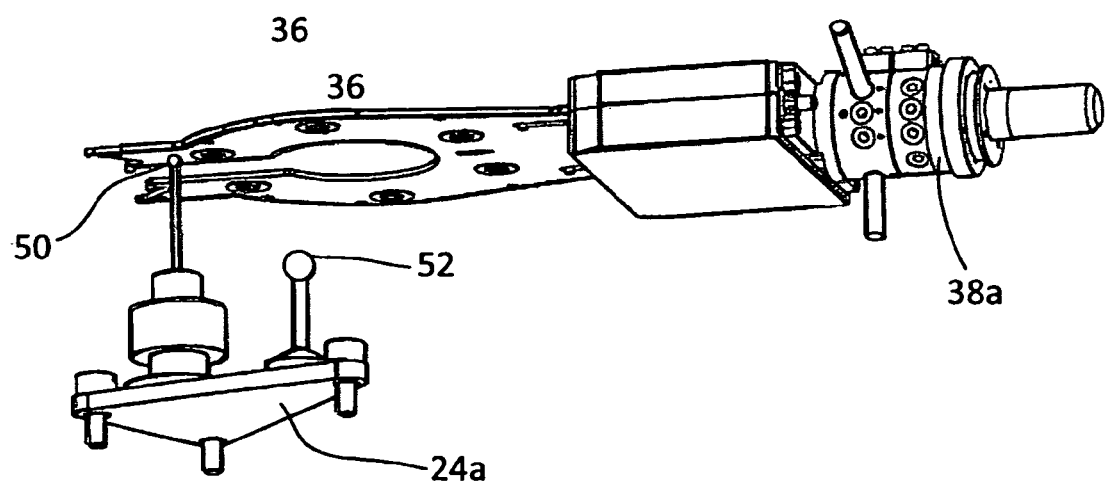
FIG. 5 is a view illustrating contact of the edge effector with the reference tactile sensor on a sub-platform in case of installation of a new end effector.

The working cycle is started from detecting a type of the objects located, e.g., in the canister 31, by an optical sensor 46 (FIG. 1). Optical reflections from an object to be picked up, i.e., from the semiconductor wafers W, paper or fabric interleaves, and paper or plastic interleaves supporting a separation ring are different in their nature. The type of the object is determined by the level of reflection, and this level, in turn, determines a command that is sent to the CPU for selecting a mode of operation, For example, if the selected object for the first operation is a semiconductor wafer W, the wafer will be picked up and transported to the first processing station, e.g., the checking unit 28 or the intermediate storage 44. In case of an interleave or a separation ring, the object is transferred to canister 33. Upon completion of the testing operation on the checking unit 28, depending on the results of the test, the semiconductor wafer W is sorted to the FOUP or cassette 30 or 32. Since the robot arm head 40 which is used for picking up the semiconductor wafer W is not suitable for placing the wafer to a FOUP, prior to dropping the wafer into a nest of the FOUP, it is necessary to change the robot arm head 40 and replace is with a mechanical end effector 36, which is stored in the nest 36a (FIGS. 3 and 4A). For this purpose it is necessary to find exact location of the edge effector 36 in the operative coordinate system. It is also important since the edge effectors may be of different types. This operation is shown in FIG. 5 which is a view illustrating contact of the edge effector 36 with the reference tactile sensor 50 on a subplatform 24a in case of installation of a new end effector.

Upon completion of a given number of full working cycles or upon expiration of a given operational time, the robotic station 20 is switched to a self-teaching procedure.

More specifically, according to another aspect of the invention, the robotic station is provided with a unique robot teaching system that allows precision self-teaching of the robot arm and all machine stations for each EOAT where the object(s) can be placed into their storage locations or working positions and picked up to perform multiple working cycles in accordance with a required sequence, with high accuracy and with automatic compensation of an accumulated error without interruption of the working process. Such an error may be accumulated due to stack of tolerances and object holding media deviations after completion of a certain number of working cycles or because of a play in attachment mechanisms for connection of changeable tools, etc.

Having described the structure of the robotic station 20 of the invention, let us consider now the self-teaching system used in conjunction with the robotic station 20 and operation of its tools.

Teachable robotic stations for handling, transporting, and processing various objects are known in the art. In the inventors' opinion, the robotic station of the invention differs from the known stations of this type in that the robot self-teaching system is based not on measurement of the objects to be treated but on memorizing specific positions which the robot tools and the objects should assume for performing required operations. Another distinction is the use of a stationary tactile sensor, a changeable tactile sensor, and a fixed reference object which allow at each new self-teaching cycle to assign and form a new operational coordinate system. The measurement units used in this coordinate system are defined in terms of dimensions of the reference object.

More specifically, two reference objects are used, i.e., a first reference object in the form of (non-changeable) flexible reference tactile sensor 50 for initiation of the self-teaching operation (active sensor) and second reference object, e.g., a second stationary reference object such as a precision ball 52 rigidly secured on the platform 24 (only a part of this platform is shown in FIG. 2) of the robotic station 20 in the vicinity of the stationary flexible reference tactile sensor 50 (hereinafter called "reference tactile sensor).

Figure 4B:
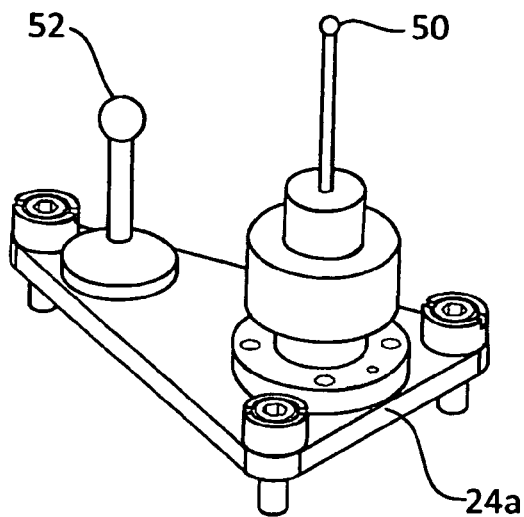
FIG. 4B is a view that shows a sub-platform that supports reference teaching components and that can be mounted on the main platform.

The platform 24 comprise a monolithic plate, while reference teaching components, i.e., the reference tactile sensor 50 and the precision ball 52 may be installed on a changeable sub-platform 24a which is shown in FIG. 4B.

As any teachable robotic station, the station of the invention is provided with a central processing unit (CPU) (FIG. 1). The station also has a changeable tactile sensor 54 (FIG. 2) that has the same coupling construction as any tool of the EOAT and can be connected to the robot arm 38 in the same manner as any tool; In fact, the tactile sensor 54 is one of changeable working tools that is stored in a certain position on the platform and is accessible for automatic connection to and disconnection from the robot arm.

In more detail, positions of the first and second reference objects, i.e., the stationary (non-changeable) flexible reference tactile sensor 50 and the second reference object, i.e., a precision ball 52 secured on the platform 24, are shown in FIG. 3 which illustrates the tactile sensor 50 in contact with the coupling unit 38a, and in FIG. 4A which shows the changeable tactile sensor 54 in contact with the second reference object 52. Reference numeral 36 designates the end effector 36 dropped into its respective nest.

In a predetermined period of time or after a predetermined number of working cycles the robot arm 38 may replace a current working tool, e.g., the end effector 36, with the changeable tactile sensor 54 for checking the state of accuracy in positions of all units and tools involved in the process. For this purpose, the coupler 38a touches the stationary (non-changeable) flexible reference tactile sensor 50 as many times as needed for geometrically determining exact position of the coupler 38a relative to the position of the changeable tactile sensor 54 in an auxiliary fixed coordinate system of the platform 24, which was preliminarily stored in the memory of the CPU. In this auxiliary coordinate system, the position of the center of the stationary (non-changeable) flexible reference tactile sensor 50 is assumed as a center of coordinate, and initial coordinates of the coupler 38a and of the changeable tactile sensor 54 stored in its nest 34a of the platform 24 are known. More specifically, the coordinates of all units and stations fixed relative to the platform 24 are preset in the memory of the CPU. These data are inputted in the form of coordinates of the auxiliary coordinate system to the CPU directly from the production drawings or a reference model.

Next, the coupler 38a goes to the changeable tactile sensor 54, which has a shank insertable into the central opening of the coupler where the shank of the changeable tactile sensor is fixed by a locking mechanism 38b in a known manner, e.g., by spring-loaded balls 38c (FIG. 3 and FIG. 4A).

Figure 6:
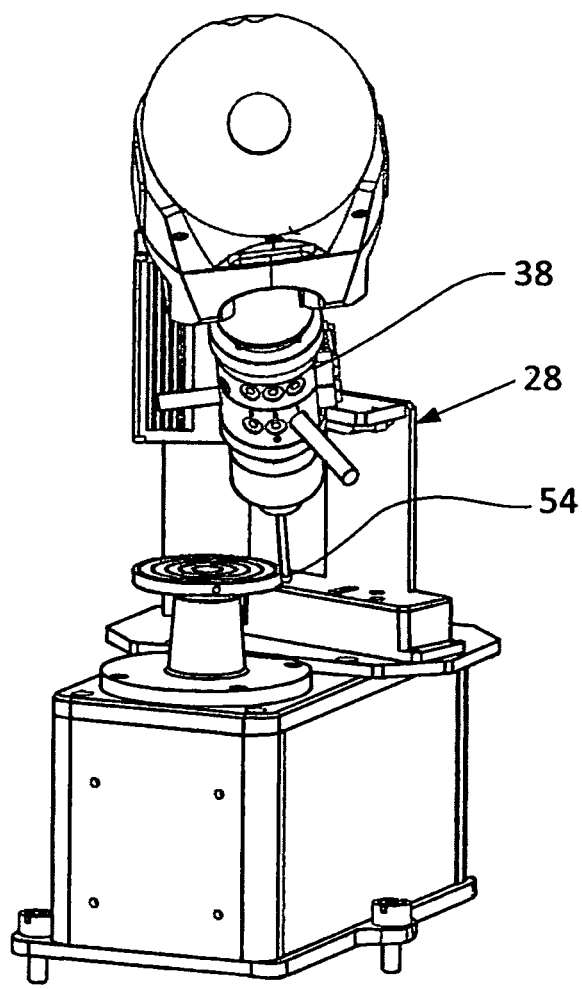
FIG. 6 is a part of the robotic station illustrating a position of the checking unit.

Next, the robot arm 38 with the changeable tactile sensor 54 fixed in the coupling 38a touches the second reference object, i.e., the precision ball 52, at least in four different points which allow to determine a position of the ball center which is then assumed as a center of an operational coordinate system. Following this, the changeable tactile sensor 54 sequentially touches all units and tools that participate in the specific process in so many points as necessary for unequivocally defining positions of these parts and units in the aforementioned operational coordinate system. This operation is illustrated in FIG. 6 which shows the changeable tactile sensor 54 in contact with the checking unit 28 (FIGS. 1 and 5). Although FIG. 6 shows detection of the position only for the checking unit, such positions are determined by multiple measurements of all units and tools that have to participate in the working process with such number of contacts of the changeable tactile sensor with the respective units and tools as necessary for calculating exact positions of these units and tools in the operational coordinate system, i.e., the coordinate system defined by the precision ball 52 (FIG. 4A).

After expiration of the given period of time or completion of a predetermined number of working cycles, the current working tool is dropped in its proper nest on the platform 24; the coupler 38a of the robot arm 38 is disconnected from the current working tool and is moved to the stationary (non-changeable) flexible reference tactile sensor 50 to touch the latter (FIG. 3). After determining the position of the stationary (non-changeable) flexible reference tactile sensor 50 in the fixed, i.e., auxiliary coordinate system of the platform, the self-teaching procedure of the robotic station 20 is resumed according to the same scenario as described above.

All the performed operations are displayed on the display 48 (FIG. 1) under control of CPU and periodically repeated. Thus, the periodically accumulated errors are eliminated and the self-teaching is automatically repeated in accordance with a given sequence.

Thus, the modes of operation of the robotic station 20 can be described by the following four configurations. The first configuration relates to a condition when the coupler 38a of the robot arm 26 is free of any EOATs. This state corresponds to the condition directly before the start of the self-teaching procedure or directly after reset of data after elimination of the accumulated errors. The second configuration is a state at which the coupler 38a of the robot arm 38 is equipped with an appropriate EOAT such a moveable tactile sensor 54. The third configuration is a state at which the moveable tactile sensor 54 is replaced with a robot arm head 40, and the fourth configuration corresponds to a state when the couple 38a is equipped with a working tool such as, e.g., an end effector 36. Four configurations are given only as an example, as well as the number of EOATs used in the process may be greater or smaller than in the illustrated example. In other words, the robotic station 20 may have five, six, or more configurations but no less than two.

FIG. 7 is a flowchart illustrating a sequence of operation of the robotic station of the invention at the processing stage. The method of self-teaching of the robotic station 20 for packing, unpacking, and processing, e.g., measuring, sorting of the objects, etc. is illustrated by a flowchart shown in FIG. 8.

A method of teaching a robotic station is applicable for a robotic station for handling and processing objects which is equipped with a central processing unit that stores data for controlling a sequence of operations in each object processing cycle to be performed by the robotic station. The station also contains a plurality of changeable object handling and transporting tools, a robot arm having a plurality of axes of rotation and a coupler for attaching and disconnecting and removing the changeable object handling and transporting tools, a plurality of fixed object processing units, a plurality of fixed places for storing the objects, and a plurality of places for storing the changeable object handling and transporting tools. At least one of the changeable object handling and transporting tools is a tactile sensor, at least one is an end effector with an edge gripper, and at least one is robot arm head free of an edge gripper.

The method consists of the following steps:
(a) providing the robotic station with a fixed auxiliary coordinate system that is stored in the central processing unit and that unequivocally defines the coordinates of the fixed object processing units, a plurality of the changeable object handling and transporting tools, and a plurality of the fixed places for storing the changeable object handling and transporting tools; storing in the central processing unit the number of the processing cycles or the time spend for the processing cycles;
(b) providing the robotic station with a first reference object having dimensions and a second reference object, the positions of the first reference object and the second reference object in the fixed auxiliary coordinate system being stored in the central processing unit;
(c) automatically moving the robot arm to a vicinity of the first reference object and touching the first reference object with the coupling as many times as needed for obtaining a number of touch points needed for unequivocally defining the position of the coupler in said fixed auxiliary coordinate system;
(d) automatically attaching the tactile sensor to the coupler, moving the tactile sensor to the vicinity of the second reference object and touching the second reference object with the tactile sensor as many times as needed for obtaining a number of touch points needed for unequivocally defining position and the dimension of the second reference object;
(e) establishing an operative coordinate system with the center of coordinates in the position of the second reference object defined in step (d) for eliminating errors in the position of the second reference object accumulated prior to step (d);
(f) storing the operative coordinate system in the central processing unit;
(g) automatically replacing the tactile sensor with a changeable object handling and transporting tool in accordance with the sequence of operations stored in the central processing unit;
(h) performing the object processing cycles until reaching the number of the processing cycles or until expiration of the time spent for the processing cycles; and
(i) repeating the steps (c) to (h) thus resetting all the data stored heretofore in the CPU for the steps (e) and (f).

Although the invention was described with reference to specific examples of the robotic station components, it is understood that any changes and modifications are possible without departure from the scope of the attached patent claims. For example, the working tools and processing stations are not limited to those described and shown in the drawings. The stations and tools may comprise metrological device for weighing, measuring warping, flatness, bowing, etc. The stations and tools may be used not only unpacking, measuring and sorting but also for packing. The teachable robotic station of the invention is applicable for processing articles other than flat objects and can be use for processing bridges, small and delicate three-dimensional objects, small spherical objects, etc. The precision self-teaching robotics systems can be implemented in assembly of parts with close tolerances, precision welding, etc. The changeable sensor can be also either a vision camera, or a displacement sensor, or a proximity sensor. This invention is also applicable to precision teaching and positioning of robot's tools for precision assembling, welding, material removal, etc.

The invention claimed is:

1. A method of teaching a robotic station for handling and processing objects, the robotic station comprising a central processing unit that stores data for controlling a sequence of operations in each object processing cycle to be performed by the robotic station, a plurality of changeable object handling and transporting tools, a robot arm having a plurality of axes of rotation and a couple for attaching and disconnecting and removing the changeable object handling and transporting tools, a plurality of fixed object processing units, a plurality of fixed places for storing the objects, a plurality of places for storing the changeable object handling and transporting tools, at least one of said changeable object handling and transporting tools comprising a tactile sensor, the method comprising the steps of:
    (a) providing the robotic station with a fixed auxiliary coordinate system that is stored in the central processing unit and that unequivocally defines the coordinates of the fixed object processing units, a plurality of the changeable object handling and transporting tools, and a plurality of the fixed places for storing the changeable object handling and transporting tools; storing in the central processing unit the number of the processing cycles or the time spend for the processing cycles;
    (b) providing the robotic station with a first reference object having dimensions and a second reference object, the positions of the first reference object and the second reference object in the fixed auxiliary coordinate system being stored in the central processing unit;
    (c) automatically moving the robot arm to a vicinity of the first reference object and touching the first reference object with the coupling as many times as needed for obtaining a number of touch points needed for unequivocally defining the position of the coupler in said fixed auxiliary coordinate system;
    (d) automatically attaching the tactile sensor to the coupler, moving the tactile sensor to the vicinity of the second reference object and touching the second reference object with the tactile sensor as many times as needed for obtaining a number of touch points needed for unequivocally defining position and the dimension of the second reference object;
    (e) establishing an operative coordinate system with the center of coordinates in the position of the second reference object defined in step (d) for eliminating errors in the position of the second reference object accumulated prior to step (d);
    (f) storing the operative coordinate system in the central processing unit;
    (g) automatically replacing the tactile sensor with a changeable object handling and transporting tool in accordance with the sequence of operations stored in the central processing unit;
    (h) performing the object processing cycles until reaching the number of the processing cycles or until expiration of the time spent for the processing cycles; and
    (i) repeating the steps (c) to (h) thus resetting all the data stored heretofore in the CPU for the steps (e) and (f).

2. The method of claim 1, comprising the step of establishing the dimensions or a fraction of the dimension of the second reference unit as a meter unit for the operative coordinate system.

3. The method of claim 2, wherein the second reference object is a solid ball.

4. The method of claim 1, wherein the number of the processing cycles is at least one.

5. The method of claim 2, wherein the number of the processing cycles is at least one.

6. The method of claim 1, wherein the step (h) comprises moving the changeable object handling and transporting tool to the coordinates stored in the central processing unit at step (f) and performing operations in accordance with the sequence stored in the central processing unit.

7. The method of claim 2, wherein the step (h) comprises moving the changeable object handling and transporting tool to the coordinates stored in the central processing unit at step (f) and in accordance with the sequence of operations stored in the central processing unit.

8. The method of claim 3, wherein the step (h) comprises moving the changeable object handling and transporting tool to the coordinates stored in the central processing unit at step (f) and in accordance with the sequence of operations stored in the central processing unit.

9. The method of claim 5, wherein the step (h) comprises moving the changeable object handling and transporting tools to the coordinates stored in the central processing unit at step (f) and in accordance with the sequence of operations stored in the central processing unit.

10. The method of claim 6, wherein the step (h) comprises moving the changeable object handling and transporting tool to the coordinates stored in the central processing unit at step (f) and in accordance with the sequence of operations stored in the central processing unit.

11. The method of claim 7, wherein the operations in accordance with the sequence stored in the central processing unit are selected from: selecting a changeable object handling and transporting tool from said plurality of places for storing the changeable object handling and transporting tools; picking up an object selected from said plurality of fixed places for storing the objects by using the selected changeable object handling and transporting tool; transporting the selected object to a fixed object processing unit from said plurality of fixed object processing units by means of the selected changeable object handling and transporting tool; placing the selected object to a processing unit selected from said plurality of fixed object processing unit; processing the selected object at the selected fixed object-processing unit; picking up the selected object from the object-processing unit; and sorting the object processed at the selected object-processing unit.

12. The method of claim 8, wherein the operations in accordance with the sequence stored in the central processing unit are selected from: selecting a changeable object handling and transporting tool from said plurality of places for storing the changeable object handling and transporting tools; picking up an object selected from said plurality of fixed places for storing the objects by using the selected changeable object handling and transporting tool; transporting the selected object to a fixed object processing unit from said plurality of fixed object processing units by means of the selected changeable object handling and transporting tool; placing the selected object to a processing unit selected from said plurality of fixed object processing unit; processing the selected object at the selected fixed object-processing unit; picking up the selected object from the object-processing unit; and sorting the object processed at the selected object-processing unit.

13. The method of claim 9, wherein the operations in accordance with the sequence stored in the central processing unit are selected from: selecting a changeable object handling and transporting tool from said plurality of places for storing the changeable object handling and transporting tools; picking up an object selected from said plurality of fixed places for storing the objects by using the selected changeable object handling and transporting tool; transporting the selected object to a fixed object processing unit from said plurality of fixed object processing units by means of the selected changeable object handling and transporting tool; placing the selected object to a processing unit selected from said plurality of fixed object processing unit; processing the selected object at the selected fixed object-processing unit; picking up the selected object from the object-processing unit; and sorting the object processed at the selected object-processing unit.

14. The method according to claim 1, wherein at least one changeable object handling and transporting tool is an end effector with an edge gripper and at least one changeable object handling and transporting tool is a robot arm head which is free of an edge gripper.

15. The method according to claim 2, wherein at least one changeable object handling and transporting tool is an end effector with an edge gripper and at least one changeable object handling and transporting tool is a robot arm head which is free of an edge gripper.

16. The method according to claim 6, wherein at least one changeable object handling and transporting tool is an end effector with an edge gripper and at least one changeable object handling and transporting tool is a robot arm head which is free of an edge gripper.

* * * * *